(12) United States Patent
Saccone, Jr.

(10) Patent No.: US 11,357,254 B2
(45) Date of Patent: Jun. 14, 2022

(54) SUB ROLL SLICING AND CONVEYING APPARATUS

(71) Applicant: Kevin James Saccone, Jr., Norwood, MA (US)

(72) Inventor: Kevin James Saccone, Jr., Norwood, MA (US)

(73) Assignee: Kevin J. Saccone, Jr., Medfield, MA (US)

( * ) Notice: Subject to any disclaimer, the term of this patent is extended or adjusted under 35 U.S.C. 154(b) by 433 days.

(21) Appl. No.: 16/671,948

(22) Filed: Nov. 1, 2019

(65) Prior Publication Data

US 2021/0127730 A1    May 6, 2021

(51) Int. Cl.
  *A23P 20/20* (2016.01)
  *B26D 7/27* (2006.01)
  *B26D 7/06* (2006.01)
  *B26D 3/30* (2006.01)
  *B26D 5/00* (2006.01)

(52) U.S. Cl.
  CPC .............. *A23P 20/20* (2016.08); *B26D 3/30* (2013.01); *B26D 7/0625* (2013.01); *B26D 7/0641* (2013.01); *B26D 7/27* (2013.01); *B26D 5/00* (2013.01); *B26D 2210/06* (2013.01)

(58) Field of Classification Search
  CPC ......... A23P 20/20; B26D 3/30; B26D 7/0625; B26D 7/0641; B26D 7/27; B26D 2210/06; B26D 2007/327; B65B 25/18
  See application file for complete search history.

(56) References Cited

U.S. PATENT DOCUMENTS

| 1,615,836 | A | * | 2/1927 | Halpin | B26D 3/30 83/872 |
| 3,494,303 | A | * | 2/1970 | Shiffer | A21C 15/007 425/371 |
| 3,631,908 | A | * | 1/1972 | Meltzer | A22C 17/0006 83/409 |
| 3,645,197 | A | * | 2/1972 | McMeekin | A21C 15/002 99/450.4 |
| 4,944,218 | A | * | 7/1990 | Cresson | G07F 17/0078 99/356 |
| 5,299,409 | A | * | 4/1994 | Daane | B65B 25/08 53/157 |
| 5,485,772 | A | * | 1/1996 | Bastasch | A21C 15/04 83/563 |
| 5,657,685 | A | * | 8/1997 | Garcia Torres | A21C 15/002 99/450.4 |
| 6,001,403 | A | * | 12/1999 | Kobayashi | A23P 20/20 426/514 |
| 6,634,282 | B1 | * | 10/2003 | Whitmore | B26D 7/0625 83/403.1 |
| 10,159,258 | B1 | * | 12/2018 | Wartman | A21C 15/007 |
| 2021/0179304 | A1 | * | 6/2021 | Lovedale | B65B 25/065 |

FOREIGN PATENT DOCUMENTS

| FR | 2639864 A1 * | 8/1990 | ............ B26D 3/30 |
| FR | 2691945 A1 * | 12/1993 | ............ B65B 25/16 |

* cited by examiner

*Primary Examiner* — Christopher R Harmon

(57) ABSTRACT

The present invention relates to the field of automated food preparation. Specifically, the present invention is a system and method for processing sub style sandwich breads and sandwiches.

1 Claim, 3 Drawing Sheets

SUB ROLL SLICING AND CONVEYING APPARATUS

REFERENCE TO PRIOR FILING

The present application claims priority to the previously filed provisional application No. 62/768,863, filed on Nov. 17, 2018 and hereby incorporates the subject matter of the provisional application in its entirety.

SUMMARY

An efficient and reliable conveyor system is required for automating the sandwich making process. The present invention pertains to the field of food processing and more specifically to the process of preparing sandwiches and similar food items that are made with a sub-style bread roll. The present invention is an apparatus wherein an un-sliced sub roll is loaded into the apparatus either by hand or via machine, the apparatus then processes the sub roll by partially cutting the sub roll lengthwise, and spreading the sub apart or "butterflying" the sub, by not cutting the sub all the way through and by leaving a small portion of the sub roll unsliced to act as a hinge holding the two halves of bread together down the middle, as is commonly done when making many sub style sandwiches by hand. Additionally, the apparatus will move the sub along the conveyor keeping the sub spread apart for the purposes of depositing ingredients from above either via hand or machine, then towards the end of the process the apparatus will fold the opened sub roll back up forming a completed sandwich. The present invention will process a sub roll in such a manner that it will enter the apparatus as a whole and un-sliced sub roll, then be sliced and spread open to allow ingredients to be deposited onto the bread, and then folded back into a complete sandwich with the options of cutting the sandwich in half and/or bagging or wrapping the finished product.

DETAILED DESCRIPTION OF THE DRAWINGS

Figure 1:
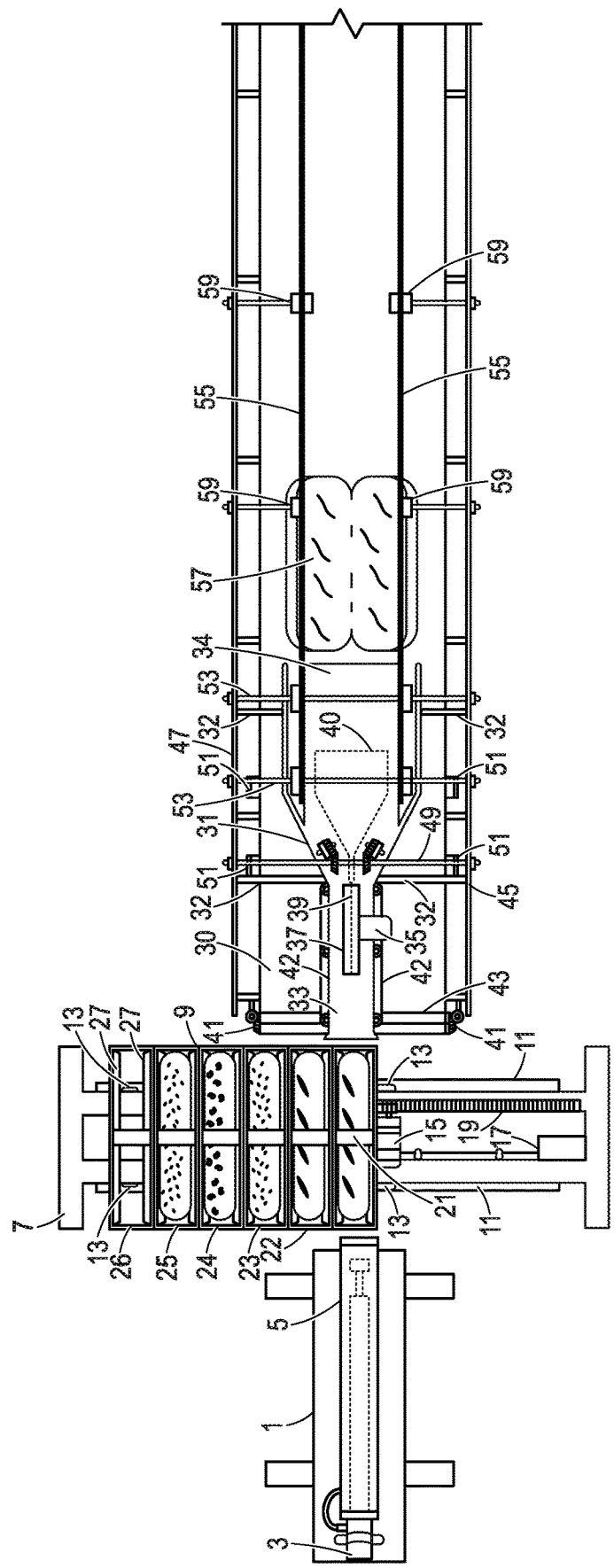
FIG. 1 is a birds eye view of the beginning of the conveying apparatus which shows from left to right, the bread bumper, the bread hopper, the blade housing at the beginning of the flexible food grade conveyor which continues further to the right, a "butterfly sliced" sub roll, and the tubular conveyor and guides used to hold the butterflied sub rolls edges down as it travels along the conveyor from left to right.

FIG. 1 begins with the "bread bumper" apparatus which entails a bread bumper stand [1], a bread bumper linear activator [3] and the bread bumper [5] as well as the bread bumper apparatus computer and controller [2] which cannot be seen from this view. The bread bumper apparatus remains stationary and its purpose is to push the bottommost bread from one of the chambers of the bread hopper apparatus, causing the bread to travel out of the bread hopper carriage [9] and into the flared entrance of the blade housing [33]. This is done by having the bread bumper computer [2] communicate with at least the conveyor computer and controller [28] and various sensors (neither of which are visible from this view) to ensure proper alignment of the bread bumper [5] and the desired chamber of the bread carriage [9]. Once the desired positioning is achieved the linear activator [3] is powered to extend the bread bumper [5] to travel from left to right making contact with the bottommost sub roll in the bread carriage [9] and pushing the bread into the entrance [33] where the bread will make contact with the food grade conveyor belt [30] on its bottom side and also tubular conveyor belting [42] which will make contact with the sides of the sub bread, the food grade belt [30] and tubular conveyor belting [42] are both moving in unison to covey the bread from left to right.

The bread carriage [9] as shown is setup to hold up to six sub roll magazines. The magazines have a handle on top to be removed vertically and lips [27] on the bottom to prevent the sub rolls from falling out the bottom, likewise there would be cutouts on the sides so that the bottom most sub bread could be pushed out of the magazine from left to right by the bread bumper [5]. As depicted the magazine [21] is in alignment with the entrance [33] and is loaded with a plain sub roll. Adjacent to magazine [21] is another magazine [22] loaded with plain sub rolls, demonstrating that certain flavors and varieties of bread that are more popular could have multiple magazines designated for their use. Next is magazine [23] that is loaded with a sesame seed sub bread, then magazine [24] that is loaded with a wheat oatmeal bread, then magazine [25] that is loaded with an herbs and cheese sub bread, then an empty magazine [26] is depicted furthest from the entrance [33]. The bread hopper carriage [9] is moved laterally by means of governing the hopper positioning motor and encoder [15] which has a gear mounted to the motor's driveshaft which makes contact with the hopper positioning gear rack [19]. The hopper carriage itself glides along a track [11] by means of track rollers [13] and the track and apparatus itself are kept at the proper height so that the bottommost portion of each magazine is aligned with the entrance of the blade housing [33] by means of a simple stand [7]. The position of the bread hopper carriage [9] is governed by the bread hopper computer [17] which calculates the position of the carriage by recording movements of the motor by means of the built in motor encoder, as well as by using sensors and communications between the bread bumper computer [2] and the conveyor computer and controller [28]. Note that there is a plurality of means of moving the bread carriage [9] laterally, and that the version depicted is merely one of many potential embodiments.

As the sub bread moves towards the blade housing [31] it enters the entrance [33], once inside the blade housing [31] the sub is conveyed towards the rotary blade [39], serrated in the preferred embodiment, that is powered by the blade motor [35] which sits on the outside of the blade housing [31]. The top portion of the blade [39] that would protrude above the blade housing [31] is protected by a blade guard [37] which covers the top portion of the blade for safety, and could be removable for cleaning. The blade housing [31] is designed so that it is open along the bottom and the sub bread can make contact with the belt [30] on the bottom edge of the bread, the blade housing [31] is held in place slightly above the belt [30] by blade housing brackets [32] which connect the blade housing [31] to both the right side conveyor mounting bracket [45] and the left side conveyor mounting bracket [47], these brackets [45 & 47] are simply stationary brackets that are used to fasten and position the various components, gears and linkages above and along the conveying apparatus.

As the sub moves into the entrance [33] it makes contact with the tubular conveyor belting [42] on both sides and the belt [30] on the bottom side. The tubular belting [42] is powered by a power transmission belt [43] which is in turn powered by a bevel gear assembly [41] that derives power from the conveyor motor [29] which is in the same housing as the conveyor computer and controller [28]. The bevel gear assembly [41] would comprise of two bevel gears, one being mounted to a roller which is powered by the conveyor motor [29], and to another bevel gear which is mounted to the right side conveyor mounting bracket [45] or the left side conveyor mounting bracket [47] to hold both bevel gears in constant contact with one another, the bevel gear not connected directly to the conveyor roller would have a driveshaft mounted 90 degrees from the conveyor roller and a pulley on the opposite end, therefore power transmission belt [43] could be fastened to the pulley and as it rotated it would rotate a pulley mounted along the sides of blade housing [31] and power the movement of another tubular conveyor [42] intended to propel the bread from left to right.

By skillfully designing such an assembly one can utilize the power from one primary conveyor motor [29] and use it to power a multitude of other conveyors which also serve to propel the bread from left to right and hold it in the proper position such as the tubular conveyor [42] to move the bread through the blade housing and the tubular conveyor [55] which holds the edges of the bread down as it exits the blade housing [31]. The tubular conveyors [42] keep the bread from jamming as it passed through the blade [39], which is positioned so that it cannot slice the bread all the way through but leaves a portion of the bottom of the bread unsliced so that the bread can be unfolded or "butterflied" with the bottommost unsliced portion acting as a hinge to keep the bread together as one butterflied sub roll [57] upon passing out of the blade housing exit [34]. Immediately after making contact with the blade [39] the bread comes into contact with a wedge [40] which gradually separates or unfolds the bread as it is conveyed through the blade housing [31] from left to right.

The wedge [40] starts as a very narrow divider meant to slide into the sub bread where it has been sliced by the blade [39] then the wedge [40] gradually gets wider to unfold the bread until it has been completely butterflied. A bread propelling assembly [49] is shown to assist in separating and moving the bread through the blade housing [31]. The bread propelling assembly [49] consist of a driveshaft that is mounted to the right and left side conveyor mounting brackets [45 & 47] to fix the positioning of the driveshaft while allowing the driveshaft to rotate, the end of the driveshaft has a conveyor power linkage [51] which connects to one of the rollers of the conveyor that is ultimately powered by conveyor motor [29], the middle of the driveshaft has two bevel gears that are coupled with another bevel gear, which has a textured roller connected to it so that the roller makes contact with the bread through a cutout in the blade housing [31] and these bevel gears are designed so that the one with the roller which is making contact with the bread is rotating upon an axis approximately 45 degrees from the driveshaft and not the 90 degree angle that standard bevel gears are designed for. As the sub bread nears the exit of the blade housing [31] the bread is spread open and makes contact with a tubular conveyor belt [55] on each side of the bread that serves to hold the bread open as it progresses along the conveyor so that ingredients can be deposited upon it more easily.

The tubular conveyor belt [55] is powered by a conveyor power linkage [51] which transmits power from the conveyor roller to the tubular conveyor pulley driveshaft(s) [53] which rotate pulleys that move the tubular conveyor belting, again utilizing the power of the conveyor motor [29] to move supplemental conveyors. By using a tubular conveyor belt [55] and pulleys one needs to only power one primary pulley on each side of the apparatus with a conveyor power linkage [51] and the remaining pulleys can simply be support pulleys [59] that serve to guide the tubular conveyor belt [55] and for which the driveshaft only connects to one of the right or the left conveyor mounting brackets [45 or 47] this way the middle of the driveshaft will not make accidental contact with any of the ingredients nor will it block the act of depositing ingredients at certain locations.

The support pulleys [59] will serve to keep and maintain tension, of course additional conveyor power linkages [51] could be used to disperse the power more evenly, but they are not necessary. Note that blade housing [31] has cutouts below the tubular conveyor belt [55] so that the tubular conveyor belt [55] can make contact with the sub bread as it travels through the blade housing [31]; also note that the apparatus could be designed without the use of tubular belts but with tracks, lips, or a plurality of pulleys that make contact with the bread. However, the preferred embodiment uses tubular conveyors [55] as this is the most sanitary and can be cleaned with greater ease. Likewise, the plurality of conveyors could be powered by a plurality of motors without affecting the operation of the invention, however, the preferred embodiment uses one motor as it is most efficient and makes washdown applications easier as there is only one motor that needs to be incapsulated in a waterproof housing.

Figure 2:
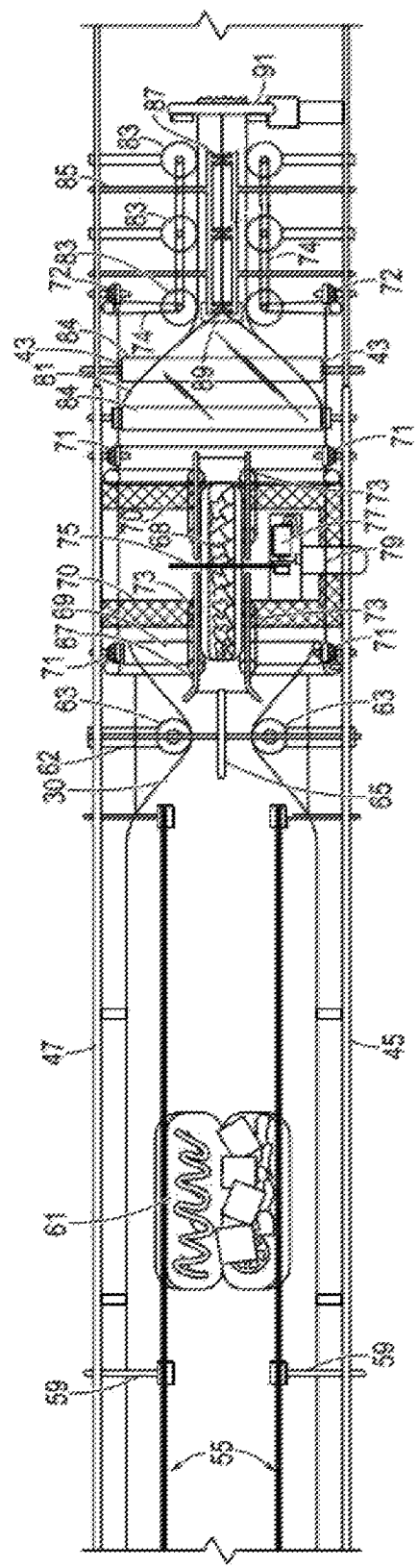
FIG. 2 is a birds eye view of the end of the conveying apparatus which depicts from left to right a butterflied sub bread with ingredients deposited onto it, the sandwich folding apparatus, the sandwich halving apparatus with a finished sandwich about to be halved, the end of the flexible food grade conveyor ends just after the sandwich halving apparatus and the sandwich wrapping apparatus. If Figure two were placed to the right of FIG. 1 one would have the complete birds eye view of the conveying apparatus.

FIG. 2 is a continuation of FIG. 1 detailing the actions of the conveying apparatus after the bread has exited the blade housing [31] and has progressed along the belt [30] while being held in the open or butterflied position by tubular conveyors [55]. The means of depositing the ingredients onto the bread are not outlined specifically in the present invention but ingredients could be deposited via human hand, an ingredient depositing machine, a robot, or a combination of the aforementioned methods. A sandwich with ingredients deposited on it [61] is shown traveling along the apparatus.

The sandwich [61] is still in the "butterflied" position and will remain so until the sandwich travels into the "sandwich folding apparatus" which consists of two or more conveyor narrowing track rollers [63] that are held in position by means of a conveyor narrowing track roller mount [62] which is mounted to the left and right side conveyor mounting brackets [45 & 47] and is positioned between the top and bottom portion of the belt [30], and the ingredient positioning guide roller [65] which is a smooth circular food-grade pulley that is mounted to a driveshaft which is supported by both the left and right side conveyor mounting brackets [45 & 47] wherein the circular food grade pulley is allowed to rotate freely and is positioned slightly above the belt [30] and could even be making contact with the belt [30] depending upon the desired tension required for a particular application or menu item.

Although not depicted in the drawings the roller [65] could also be powered to rotate at a speed similar to the belt [30] and there could also be springs or tensioners used so that the vertical positioning of the roller [65] were allowed to fluctuate depending on what passes underneath or to ensure that a certain downward pressure were not to be exceeded. Furthermore, it need not be designed as a round pulley but could also be a tubular conveyor supported by a plurality of pulleys or a polygonal figure, but roundness is preferred for not damaging the ingredients of the sandwich. The two conveyor narrowing track rollers [63] serve to apply inward pressure on both sides of the flexible food grade conveyor [30] causing the belt [30] to transition from a flat position to a pinched position which creates a u-shaped corridor for the sandwich [61] to pass through. The belt [30] is prevented from rising upwards by means of the tension provided by the roller at the end of the conveyor [69] and the roller [65] applying downward pressure to the center of the belt [30] as it passes between the two narrowing track rollers [63].

Not shown in the figures, an additional means of keeping the belt [30] from rising entails having a protrusion which is part of the belt [30] and extends underneath the belt [30] in a manner so that the protrusion travels in a track which prevents the center of the food grade conveyor belt [30] from rising by guiding the belt from the bottom. In another embodiment, there could be a cutout or opening beneath the belt [30] at the pinched section, allowing the belt [30] to travel downwards due to the force of an ingredient positioning guide roller [65] or similar means which would be positioned relatively lower so that the bottom edge of the positioning guide roller [65] is beneath the conveyor. As the sandwich [61] approaches the "sandwich folding apparatus" the tubular conveyor [55] ends, allowing the sides of the bread to fold back up and close, meanwhile, the belt [30] itself provides inward pressure on the outside of the sub bread folding the sandwich [61] closed as the belt [30] is pinched by the two track rollers [63] and the ingredient positioning guide roller [65] makes contact with the ingredients of the sandwich [61] to apply downward pressure while the sides of the bread are folded inwards to prevent the ingredients from rising up and out of the bread. Therefore, a sandwich enters the "sandwich folding apparatus" resembling a butterflied sandwich with ingredients on it [61] and exits this portion of the apparatus as a u-shaped closed sandwich with ingredients on it [68].

Upon exiting the "sandwich folding apparatus" the sandwich [68] is is transferred onto the "sandwich halving apparatus" which comprises: a finished sandwich track [67] which is essentially a U-channel which holds the sandwich [68] in a u-shape and prevents it from unfolding, the track [67] has cutouts for exposing the sides of sandwich [68] to the finished sandwich track propelling system [73] which is a combination of pulleys and conveyors very similar to those used in the beginning portion of the blade housing [31], a blade [75], a blade motor [77] and a blade sensor [79]. The finished sandwich track is held in place by supporting bracket [70] which connects to the left and right-side conveyor mounting brackets [45 & 47] and also provides support for the blade [75], the blade motor [77] and blade sensor [79]. Upon entering the finished sandwich track [67] the finished sandwich [68] is conveyed from left to right by the means of the track propelling system [73] which is powered by bevel gear assemblies [71] which transmit the power from the conveyor motor [29] by means of connecting the conveyor roller at the end of the food grade flexible conveyor [69] to the bevel gear assemblies [71] which power the track propelling system [73]. To detect when the center of the sandwich [68] is aligned with the blade [75], the blade sensor [79] can be used to discern the position of the finished sandwich via communicating with the blade computer and activator [80] and using an application which uses the time the sensor detects an object and also the speed of the track propelling system [73] to determine the approximate center of a sandwich.

Furthermore, the track propelling system [73] would pause when the finished sandwich [68] is centered under the blade [75], at which point the blade motor [77] would be activated, turning a linkage which holds the blade [75] and moves the blade [75] in a reciprocating motion; once the blade [75] is reciprocating it will be lowered to cut all the way through the finished sandwich [68] by means of the blade computer and activator [80]. The blade [75] would then wait until the finished sandwich has left the finished sandwich track [67] prior to returning to its position above the sandwich.

Note that while a simple means is portrayed herein for cutting the sandwich widthwise, a plurality of similar means are conceivable and within the scope of the invention, for instance a blade could be rotated 90 degrees and pass through the sandwich from right to left or vise versa, similarly a blade could be double edged and make cuts while passing in multiple directions. Or the sandwich [68] itself could be rotated 90 degrees and get conveyed through a blade. Additionally, a plurality of blade styles could be used such as a rotary blade, wire blade, banded blade, ultrasonic blade, or a simple knife blade that gets pressed into the finished sandwich [68]. As the finished sandwich [68] exits the halving apparatus, it gets moved onto the "wrapping apparatus."

Figure 3:
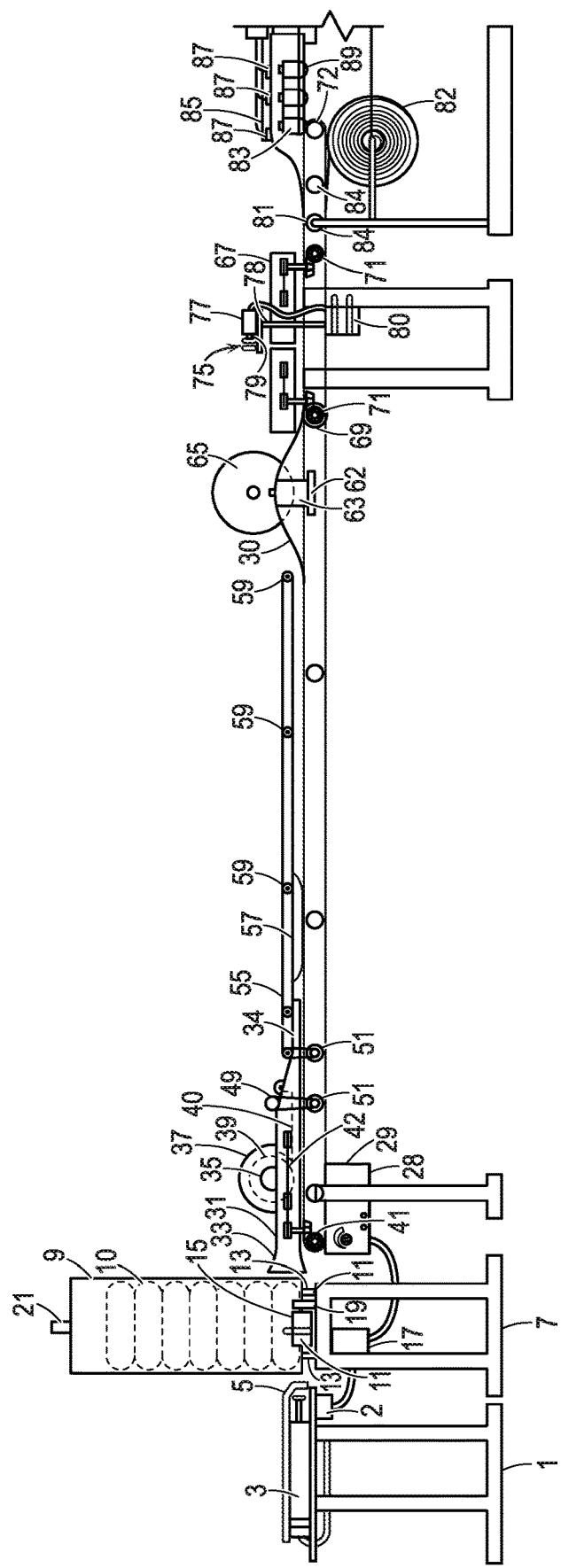
FIG. 3 is a simplified side view of the complete conveying apparatus which gives a visual of how the apparatus would work, note that certain features which would block visibility of the essential components have been omitted such as the right side and left side conveyor mounting brackets.

The wrapping apparatus is comprised of plastic wrap [81] which is fed from a spool [82] which is visible in FIG. 3, around a conveyor roller [84] and then gets guided through a series of wrapping track rollers [83] which narrow the plastic wrap [81] on the sides, meanwhile the two outer edges are brought together above the conveyor where they are guided and joined together by the top rollers and sealers [87] which are held in place by the top roller and sealer bracket [85] which is mounted to the left and right side conveyor mounting brackets [45 & 47]. Meanwhile, the plastic wrap [81] is supported on the bottom by the bottom track rollers [89] and then sealed by the clamping and sealing device [91] that is electrically powered and uses a combination of heat and pressure to seal the plastic wrap [81]. The wrapping apparatus is shown as being powered by a bevel gear assembly [72] that transmits power from the conveyor motor [29] to the wrapping track rollers [83] by means of a bevel gear assembly [72] which uses a combination of driveshafts and pulleys to turn a power transmission belt [74] which turns pulleys mounted to the wrapping track rollers [83].

The preferred embodiment as depicted in FIGS. 2 and 3 is useful when there is very little friction between the plastic wrap [81] and the wrapping track rollers [83]. Therefore, under normal circumstances without the presence of a finished sandwich [68] being between the wrapping track rollers [83] the plastic wrap [81] will not be moved despite the fact that the wrapping track rollers themselves are being driven to rotate because there is insufficient friction between the plastic wrap [81] and the wrapping track rollers [83] and hence continual/steady power can be applied to the wrapping track rollers by the bevel gear assembly powering the wrapping apparatus [72] without the need to worry about wasting plastic wrap [81]. As when the sandwich [68] enters the wrapping apparatus and increases the pressure between the plastic wrap [81] and the wrapping track rollers [83] the friction between the plastic wrap [81] and the wrapping track rollers [83] will be increased causing the wrapping track rollers [83] to not only propel the sandwich from left to right but to also pull the plastic wrap [81] from its spool [82], over wrapping conveyor rollers [84] all the way through the wrapping station until the sandwich [68] has exited or moved to the right of the wrapping track roller nearest the clamping and sealing device [91].

The plastic wrap [81] completely wraps around the finished sandwich [68] and the excess margin of wrap [81] is brought together above the sandwich and pressed and sealed by the top rollers and sealers [87] which use means of heat and pressure to bind the two edges of the plastic wrap [81]. These top rollers and sealers [87] are powered by electricity and governed by a processor and/or a computer and also use sensors to only activate the heating element when necessary and to the proper temperature. The clamping and heating device [91] is likewise powered by electricity and governed by a processor and/or computer and sensors so that it could clamp and seal the plastic wrap [81] on both sides of a sandwich [68] after the plastic wrap [81] has been sealed on top forming a tube around the sandwich [68], completely sealing the sandwich [68] in plastic wrap [81].

While the bagging apparatus is shown as being powered by the conveyor motor [29] by means of a bevel gear assembly [72], another method of powering the wrapping apparatus would be for the wrapping apparatus to have a separate motor that is working with a computerized processor and a plurality of sensors to power the wrapping apparatus on when a finished sandwich [68] is present and in need of being wrapped and to power it off otherwise. A separate motor and/or controller would be useful in applications where friction between the plastic wrap [81] and the wrapping track rollers [83] is not a reliable means of controlling the wrapping apparatus and hence it would waste plastic wrap [81] and not perform well. Likewise, a plurality of different means of wrapping a sandwich are feasible, the preferred embodiment has been depicted herein.

I claim:

1. An automated sub roll processing apparatus comprising;
   at least one conveyor or actuator which moves the sub roll;
   a bread dispensing mechanism which holds a plurality of sub breads in magazines;
   a housing or channel which positions the sub roll as it is conveyed;
   a blade or wire used to partially cut the sub roll lengthwise without separating the sub roll into two separate pieces;
   a wedge or divider used for unfolding the sliced sub roll after it has been cut;
   a means for folding the sliced sub roll back into a u-shape;
   a means for cutting the sub bread widthwise;
   a means for wrapping the sub bread.

* * * * *